July 29, 1969  C. G. CASSADY  3,458,796
SOFT START CIRCUIT FOR POWER SUPPLY CIRCUITS
Filed Feb. 6, 1968  2 Sheets-Sheet 1

INVENTOR
C. G. CASSADY
BY Walter M. Hiel
ATTORNEY

July 29, 1969  C. G. CASSADY  3,458,796
SOFT START CIRCUIT FOR POWER SUPPLY CIRCUITS
Filed Feb. 6, 1968  2 Sheets-Sheet 2

United States Patent Office 3,458,796
Patented July 29, 1969

3,458,796
SOFT START CIRCUIT FOR POWER
SUPPLY CIRCUITS
Charles G. Cassady, Winston-Salem, N.C., assignor to Bell
Telephone Laboratories Incorporated, Murray Hill,
N.J., a corporation of New York
Filed Feb. 6, 1968, Ser. No. 703,453
Int. Cl. H02m 1/08, 7/44, 7/68
U.S. Cl. 321—5                                13 Claims

ABSTRACT OF THE DISCLOSURE

A soft start circuit for a phase-controlled thyristor regulated power supply circuit having a magnetic amplifier for controlling the conduction of the thyristors. The control winding of the magnetic amplifier is initially connected to the alternating current power terminals of the power supply through a series-connected capacitor and rectifier so that, as the alternating current power is applied, the initial charging current flowing through the capacitor and control winding causes the magnetic amplifier to block the thyristors. As the capacitor charges, the current in the control winding gradually falls off to permit the thyristors to conduct during increasingly larger phase angles. The control winding is automatically switched into its normal control circuit when the rectified output voltage approaches the desired regulated level.

Background of the invention

This invention relates to the regulated power supply art and more particularly to a soft start circuit for a phase-controlled power supply circuit employing thyristors controlled by a magnetic amplifier.

A phase-controlled thyristor regulated direct current power supply frequently employs a series of inductor and a shunt capacitor as its ripple filter and, when alternating current power is initially applied, an undesirable voltage overshoot can take place in its output circuit which often exceeds twenty percent of the rated output voltage. Where solid state devices are included in a permanently connected load, this overshoot often cannot be tolerated without risk of damage to the devices. Soft start circuits, sometimes referred to as "walk-in" circuits, have been devised heretofore and some of these involve rather sophisticated circuitry using solid state devices. For reasons of economy, simpler circuits are needed where overshoots not exceeding three percent can be tolerated by the permanently connected load.

Summary of the invention

The present invention strongly supresses the initial output overshoot voltage of a phase-controlled regulated power supply circuit using a magnetic amplifier to control the conducting phase angles of its rectifying means. This is accomplished by employing the charging current characteristic of a capacitor connected in a series circuit with a rectifier and the control winding of the magnetic amplifier. This series circuit is connected across the alternating current power source at the same instant that the alternating current source is applied to the regulated power supply circuit so that the large initial charging current flowing through the control winding can temporarily block transmission of the conduction control currents to the rectifying means of the power supply circuit. As the capacitor charges from successive pulses of rectified current, the current pulses gradually reduce in intensity, thereby causing the magnetic amplifier to permit conduction by the rectifying means during increasingly larger phase angles. When the rectified output voltage approaches its normal regulated level, the control winding is automatically disconnected from the series circuit and is connected to its normal control circuit of the regulator.

Brief description of the drawings

The invention may be better understood by reference to the accompanying drawings in which.

Detailed description

Figure 1:
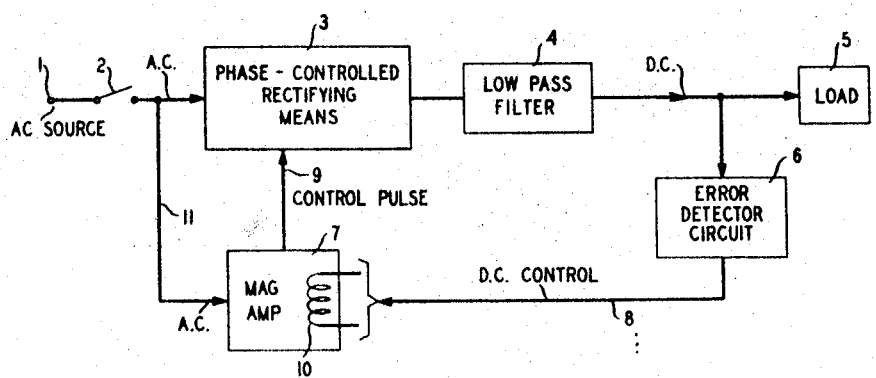
FIG. 1 is a block diagram of a phase-controlled regulated power supply circuit of the prior art.

The block diagram of FIG. 1 illustrates the essential circuit elements of a well-known type of phase-controlled regulated power supply employing a magnetic amplifier to control the phase angles during which the rectifiers are conductive. The phase-controlled rectifying means 3 receives power from an alternating current source, represented by terminal 1, through a switch 2. This power is applied to the input circuit of the rectifying means 3 and the rectified output therefrom is passed through low-pass filter 4 and applied to load 5. An error detector circuit 6 monitors the output voltage applied to load 5 and if it differs from a predetermined reference level the difference is applied to the control winding 10 of magnetic amplifier 7 by way of circuit path 8. The control current applied to control winding 10 determines the phase angle during which the rectifiers in rectifying means 3 will be conducting in each cycle of alternating current. The control phases for activating the rectifiers are supplied by magnetic amplifier 7 to the rectifying means 3 by way of circuit path 9. Alternating current power is supplied to the magnetic amplifier by way of circuit path 11. This type of circuit will be recognized as old in the art as exemplified by United States Patent 3,218,540, granted Nov. 16, 1965 to S. P. Jackson.

As previously mentioned, when switch 2 is closed to supply alternating current power to rectifying means 3, alternating current power is also supplied to the magnetic amplifier 7 by way of circuit path 11. However, at this instant there is no direct voltage output applied to load 5 and, consequently, the direct current control path 8 will cause the magnetic amplifier to transmit control pulses to the rectifiers in rectifying means 3 and cause them to conduct throughout a maximum phase angle. These large pulses emerging from rectifying means 3 and applied to low-pass filter 4 will cause an overshoot in the output voltage applied to load 5 before the error detector circuit 6 can establish control.

In many present day circuits, load 5 is permanently connected to the power supply circuit and if this load contains solid state devices there is great risk that they may be damaged by this initial overshoot. A more detailed description of the operation of the circuit in FIG. 1 is unnecessary to an understanding of the present invention but such a detailed description of a typical circuit may be found in the above cited patent.

Figure 2:
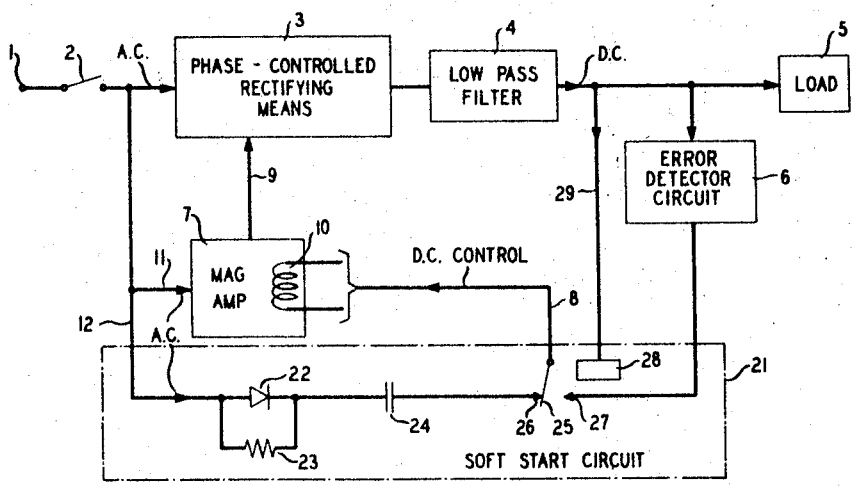
FIG. 2 is a block diagram of a circuit of the type shown in FIG. 1 but incorporating the essential elements of the present invention.

FIG. 2 shows a block diagram of FIG. 1 modified to embody an elementary form of the present invention. It will be noted that a soft start circuit 21 has been included in circuit path 8 leading to the control winding 10. The circuit path 8 from error detector 6 has been interrupted and a normally closed contact pair 25, 26 is shown connecting the control winding 10 in a series circuit with a capacitor 24, a rectifier 22 and the alternating current source by way of circuit path 12. When switch 2 is closed to apply power to the rectifying means 3, it also applies alternating current power to the series circuit comprising rectifier 22, capacitor 24 and the control winding 10. The initial current pulses will be large, thereby producing a strong bias in control winding 10 which momentarily prevents the rectifying means 3 from operating. However, as successive rectified current pulses flow through capacitor 24, it accumulates a charge so that these current pulses gradually reduce in intensity, thereby reducing the bias in control winding 10 to the point where the rectifying means will start conducting through larger and larger phase angles by reason of pulses now arriving from the magnetic amplifier 7 by way of circuit path 9. As the rectifying means becomes enabled, output pulses gradually build up and flow into the low-pass filter 4, thereby developing an output voltage for application to the load 5 and the error detector circuit 6. Contact 25 is shown as the armature of a relay having a coil 28 which is energized by current over path 29 from the output circuit of the regulated rectifier. When the voltage applied to load 5 reaches a predetermined level, relay 28 suddenly switches armature 25 from contact 26 to contact 27, thereby disabling the soft start circuit and reestablishing normal regulating action.

The regulator may be shut down by simply opening power supply switch 2, thereby permitting relay 28 to reestablish the circuit through the contact pair 25, 26. A circuit path including resistor 23 now permits any residual charge remaining on capacitor 24 to discharge through a direct current path including the control winding 10 of the magnetic amplifier. More detailed circuits showing this function will be described later.

Figure 3:
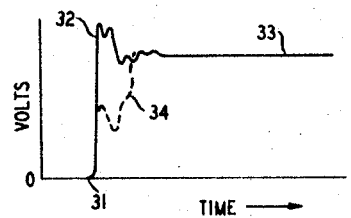
FIG. 3 discloses the output voltage characteristics of regulated power supply circuits when they are initially turned on and illustrates the improvement afforded by this invention.

FIG. 3 discloses the strating characteristics of the regulated rectifiers shown in FIGS. 1 and 2. It is assumed that the regulators are turned on at the instant in time represented by reference numeral 31. The rectifier circuit of FIG. 1 will produce a voltage overshoot typically represented by the solid characteristic 32 which subsequently settles down to the desired regulated voltage level represented by the horizontal portion 33 of the characteristic. The starting characteristic of the circuit of FIG. 2 embodying the present invention is represented by the dotted portion 34 in FIG. 3 which shows little or no overshoot above the regulated voltage represented by the horizontal line 33. It is to be understood that these characteristics are to be taken as typical and the same characteristics will not be necessarily obtained with every circuit. However, it has been found that without the present invention a substantial overshoot portion corresponding with portion 32 will frequently be obtained.

Figure 4:
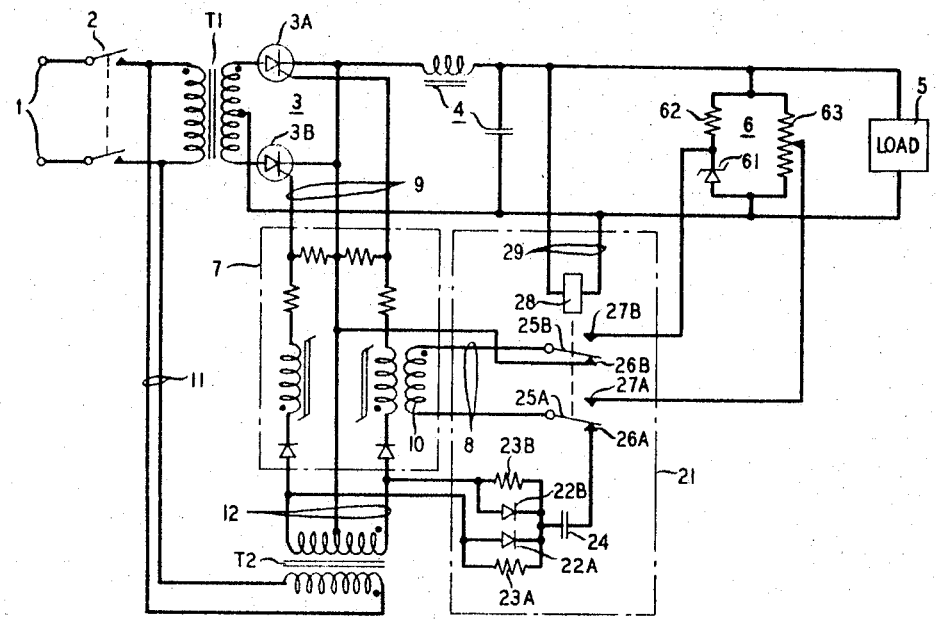
FIGS. 4 and 5 disclose practical circuits embodying the present invention as applied to regulated power supply circuits arranged for connection to single-phase and three-phase alternating power supply circuits, respectively.

FIG. 4 discloses the invention embodied in a circuit constructed to be supplied by a source of single-phase alternating current applied to terminals 1. When switch 2 is closed, alternating current is simultaneously supplied to the primary windings of both transformers T1 and T2. The secondary circuit of transformer T1 supplies current to the phase-controlled rectifying means 3 comprising devices 3A and 3B shown by symbols representing thyristors. The cathodes of the two thyristors are connected together and to one terminal of the inductor in ripple filter 4. The capacitor of this ripple filter is connected across the output circuit between the other terminal of the inductor and the center tap of the secondary of transformer T1. Also connected across the output circuit, in parallel with the filter capacitor, is the load circuit 5 and the error detector circuit 6. Thyristors 3A and 3B are caused to conduct during phase angles determined by pulses applied to their gate circuits by way of control circuit 9. Control circuit 9 is supplied by control pulses from magnetic amplifier 7 of conventional construction. Alternating current is supplied to the magnetic amplifier 7 by way of circuit path 12 from the secondary winding of transformer T2. The soft start circuit 21 comprises a capacitor 24 and rectifying means 22A and 22B which are each connected in series with control winding 10 by way of contact pairs 25A, 26A and 25B, 26B. It will be noted that rectifier 22A is connected between the left hand terminal of the secondary of transformer T2 and the left hand terminal of capacitor 24. Similarly, rectifier 22B is connected between the right hand terminal of the secondary of transformer T2 and the left hand terminal of capacitor 24. Quite satisfactory operation is obtained with only one such rectifier but where two rectifiers are used and connected in the manner disclosed in FIG. 4, a charging pulse for capacitor 24 will exist during the first voltage peak, regardless of polarity. The charging circuit path may be traced from the secondary of transformer T2 through the rectifiers 22A or 22B, the capacitor 24, control winding 10 and back to the secondary of transformer T2 at its center tap. As previously described, the current pulses through capacitor 24 will gradually diminish in intensity as successive pulses are received, thereby reducing the bias current through control winding 10. As this current reduces, output pulses from magnetic amplifier 7 will be received over circuit 9 by the gate terminals of thyristors 3A and 3B, causing them to conduct through increasingly larger phase angles. This results in the gradual voltage build-up across the load circuit 5.

It will be observed that relay 28 is connected by way of circuit path 29 across the load circuit so that as the rectified output voltage increases to a predetermined level switch arms 25A and 25B quickly transfer to switch points 27A and 27B, thereby connecting control winding 10 to its normal regulating circuit through error detector circuit 6.

Error detector 6 is shown comprising a reference Zener diode 61 in series with a resistor 62 connected across the load circuit. There is also a potentiometer 63 connected across the load circuit. The operation of this circuit is essentially the same as that described in the above-cited patent and it will be understood that when the voltage existing at the slider of potentiometer 63 departs from its desired level with reference to the voltage at the upper terminal of diode 61, an appropriate current is supplied to the control winding 10 to cause the magnetic amplifier 7 to change the phase angle through which thyristors 3A and 3B conduct in the proper direction to correct for the change in output voltage.

It will be apparent from the above description of the circuit of FIG. 4 that the invention temporarily disables thyristors 3A and 3B by reason of a strong charging current through capacitor 24 and the control winding 10 but that, as this charging current gradually diminishes, the regulating action of the magnetic amplifier 7 will cause the output voltage across the load circuit to gradually increase, thereby preventing any appreciable overshoot.

Figure 5:
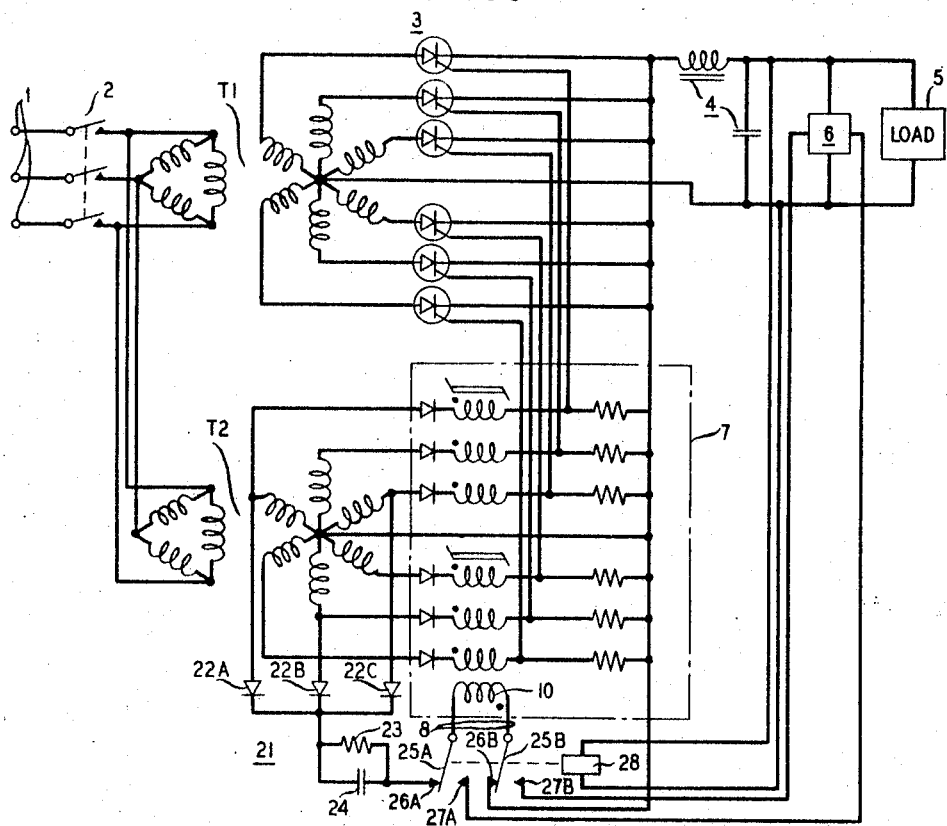

Insofar as the present invention is concerned, the circuit of FIG. 5 is essentially identical to that of FIG. 4, the differences residing solely in the structure to adapt the regulator to be connected to a three-phase alternating current power source instead of to the single-phase source shown in FIG. 4. In comparing the two figures, it will be noted that the phase-controlled rectifying means 3 comprises six thyristors instead of the two shown in FIG. 4 and that the magnetic amplifier is arranged for three-phase operation instead of for single-phase operation. Consequently, transformers T1 and T2 are three-phase transformers. In FIG. 4, two rectifiers 22A and 22B were used in a charging circuit and connected to opposite ends of the single-phase secondary winding of transformer T2. In FIG. 5, only one rectifier is shown for each phase, the three rectifiers 22A, 22B and 22C being connected by one of their terminals to one terminal of the three secondary phase windings of transformer T2 while the other terminal of each of the rectifiers is connected together and to one terminal of capacitor 24. If desired, three additional rectifiers could be added in the same manner illustrated in FIG. 4, these being connected to the opposite ends of the phase windings and joined to the common terminal on capacitor 24 in the same manner shown for the three rectifiers 22A, 22B and 22C.

The invention has been illustrated in practical embodiments in FIGS. 4 and 5 for a single-phase and a three-phase alternating current power source, respectively. Obviously, the circuitry will be essentially the same for a two-phase source or, for that matter, for an n-phase source. The operation of the circuit of FIG. 5 is identical to that described for FIG. 4 and the various parts of FIG. 5 performing the same function as their corresponding parts in FIG. 4 bear the same reference numerals.

What is claimed is:

1. A soft start circuit for a phase-controlled regulated power supply circuit of the type having a magnetic amplifier controlling the conduction phase angle of a rectifying means in accordance with the output direct voltage level of said power supply, said soft start circuit comprising a control winding on said magnetic amplifier connected in a series circuit with a rectifier, a capacitor and a normally closed switch circuit, means connecting said series circuit to a source of alternating current simultaneously with the connection of said source to said regulated power supply circuit, means including a normally open switch circuit for connecting said control winding to the output circuit of said power supply circuit for normal regulating action, and a means under control of the output direct voltage of said power supply circuit for opening said normally closed switch circuit and closing said normally open switch circuit when said direct voltage reaches a predetermined level.

2. The combination of claim 1 in which said means for opening said normally closed switch circuit comprises a relay means including said normally closed and normally open switch circuits and an actuating means therefor connected to the output circuit of said regulated power supply circuit.

3. The combination of claim 1 in which said means for opening said normally closed switch circuit comprises an electromagnetic switch having a pair of normally closed contacts comprising said normally closed switch circuit, a pair of normally open contacts comprising said normally open switch circuit and a winding controlling said contacts connected across the output circuit of said regulated power supply circuit.

4. The combination of claim 1 wherein said regulated power supply circuit is so constructed as to be connected to an n-phase alternating current source and said series circuit includes at least one two-terminal rectifier for each of the phases of said source, one of the terminals of each of said rectifiers being connected to its respective phase in said source while their other terminals are joined together and connected in series with said series circuit.

5. The combination of claim 1 wherein said regulated power supply circuit is so constructed as to be connected to a single-phase alternating current source and said series circuit includes at least one rectifier.

6. The combination of claim 1 wherein said regulated power supply circuit is so constructed as to be connected to a three-phase alternating current source and said series circuit includes at least one two-terminal rectifier for each of the phases of said source, one of the terminals of each of said rectifiers being connected to its respective phase in said source while their other terminals are joined together and connected in series with said series circuit.

7. A soft start circuit for a phase-controlled regulated power supply circuit of the type having a magnetic amplifier controlling the conduction phase angle of a rectifying means in accordance with the output direct voltage level of said power supply, said soft start circuit comprising a control winding on said magnetic amplifier connected in a series circuit with a rectifier, a capacitor and a first set of switch contacts, means connecting said series circuit to a source of alternating current simultaneously with the connection of said source to said regulated power supply circuit, means including a second set of switch contacts for connecting said control winding to the output circuit of said power supply circuit for normal regulating action, and a means under control of the output direct voltage of said power supply circuit for opening said first set of switch contacts and closing said second set of switch contacts when said direct voltage reaches a predetermined level.

8. The combination of claim 7 in which said means for opening said first set of switch contacts comprises a relay means including said first and second sets of switch contacts and an actuating means therefor connected to the output circuit of said regulated power supply circuit.

9. The combination of claim 7 in which said means for opening said first set of switch contacts comprises an electromagnetic switch containing said first and second sets of switch contacts and having a winding controlling said contacts connected across the output circuit of said regulated power supply.

10. A soft start circuit for a phase-controlled regulated power supply circuit of the type having a magnetic amplifier controlling the conduction phase angles of thyristor rectifying means in accordance with the output direct voltage level of said power supply circuit and an error detector circuit connected in the output circuit of said power supply circuit to detect departures of output voltage from a predetermined reference voltage level for controlling said magnetic amplifier, said soft start circuit comprising a series circuit of a control winding on said magnetic amplifier, a rectifier, a capacitor and a first set of normally closed switch contacts, means connecting said series circuit to a source of alternating current simultaneously with the connection of said source to said regulated power supply circuit, means including a second set of normally open switch contacts for connecting said control winding to said error detector circuit for normal regulating action, and a means under control of the output direct voltage of said power supply circuit for opening said first set of switch contacts and closing said second set of switch contacts when said direct voltage reaches a predetermined level.

11. The combination of claim 10 in which said first and second sets of switch contacts are contacts on an electromagnetic switch having a winding for actuating said contacts, said winding being connected across the output circuit of said regulated power supply circuit.

12. A soft start circuit for a phase-controlled regulated power supply circuit of the type which converts energy from an alternating current source to a source of substantially constant direct voltage and having a magnetic amplifier with a control winding for controlling the conduction phase angle of a rectifying means in accordance with the output direct voltage level of said power supply, said soft start circuit comprising a rectifier and a capacitor and means connecting them in a series circuit with said control winding and across said alternating current source simultaneously with the connection of said source to the regulated power supply circuit, and means connected to the direct voltage output circuit of said power supply circuit and responsive to a predetermined direct voltage thereof for disconnecting said control winding from said series circuit and connecting it to the output circuit of said power supply circuit for normal regulating action.

13. A soft start circuit for a phase-controlled regulated power supply circuit of the type having a magnetic amplifier controlling the conduction phase angle of a rectifying means in accordance with the output direct voltage level of said power supply circuit acting on a control winding of said magnetic amplifier, said soft start circuit being characterized by a series circuit including said control winding, a rectifier, and a capacitor, a means connecting said series circuit to a source of alternating current simultaneously with the connection of said source to said regulated power supply circuit, and a means responsive to a predetermined output voltage of said regulated power supply circuit for disconnecting said control winding from said series circuit and connecting it to the output circuit of said regulated power supply circuit.

References Cited

UNITED STATES PATENTS

| | | | |
|---|---|---|---|
| 2,596,606 | 5/1952 | Scherer | 321—32 |
| 3,350,625 | 10/1967 | Larsen | 321—45 |
| 3,355,653 | 11/1967 | Paradissis | 321—2 |
| 3,383,582 | 5/1968 | Bishop et al. | 321—18 |

JOHN F. COUCH, Primary Examiner

W. M. SHOOP, Jr., Assistant Examiner

U.S. Cl. X.R.

321—18, 25, 47; 323—22, 34